United States Patent
Youssoufian et al.

(10) Patent No.: US 8,005,449 B2
(45) Date of Patent: Aug. 23, 2011

(54) SUBSAMPLING WIDEBAND RSSI CIRCUIT

(75) Inventors: Edward Youssoufian, Irvine, CA (US); Amr Fahim, Irvine, CA (US)

(73) Assignee: Newport Media, Inc., Lake Forest, CA (US)

( * ) Notice: Subject to any disclaimer, the term of this patent is extended or adjusted under 35 U.S.C. 154(b) by 662 days.

(21) Appl. No.: 12/136,864

(22) Filed: Jun. 11, 2008

(65) Prior Publication Data

US 2009/0311985 A1 Dec. 17, 2009

(51) Int. Cl.
*H04B 17/00* (2006.01)
(52) U.S. Cl. ............... 455/226.2; 455/226.4; 455/183.2; 455/186.1; 455/245.1; 348/726
(58) Field of Classification Search ............... 455/226.2, 455/226.4, 183.2, 186.1, 245.1; 348/726
See application file for complete search history.

(56) References Cited

U.S. PATENT DOCUMENTS

| 6,175,279 | B1 * | 1/2001 | Ciccarelli et al. ............. 330/296 |
| 2005/0281151 | A1 * | 12/2005 | Kanda ......................... 369/44.34 |
| 2008/0225182 | A1 * | 9/2008 | Silver et al. ................... 348/726 |

OTHER PUBLICATIONS

Zhang, et al., "Bipolar Microwave RMS Power Detectors," IEEE Journal of Solid-State Circuits, vol. 41, No. 9, Sep. 2006, pp. 2188-2192.

Jeon, et al., "Analog AGC Circuitry for a CMOS WLAN Receiver," IEEE Journal of Solid-State Circuits, vol. 41, No. 10, Oct. 2006, pp. 2291-2300.

* cited by examiner

*Primary Examiner* — Sanh Phu
(74) *Attorney, Agent, or Firm* — Rahman LLC

(57) ABSTRACT

A Received Signal Strength Indicator (RSSI) circuit includes a subsampling circuit that processes an input signal comprising a sampling frequency, fs, wherein the subsampling circuit subsamples the input signal, wherein the input signal is subsampled to concentrate a power in a narrow bandwidth; an analog-to-digital converter (ADC) operatively connected to the subsampling circuit, wherein the ADC digitizes the subsampled signal; and a baseband detector operatively connected to the ADC, wherein the baseband detector detects a power from the digitized subsampled signal and creates an output signal. The subsampling circuit and the ADC may operate as a single subsampling ADC. The RSSI circuit may further comprise ignoring higher order aliases at a multiple of the sampling frequency if the baseband detector is clocked at the sampling frequency.

20 Claims, 4 Drawing Sheets

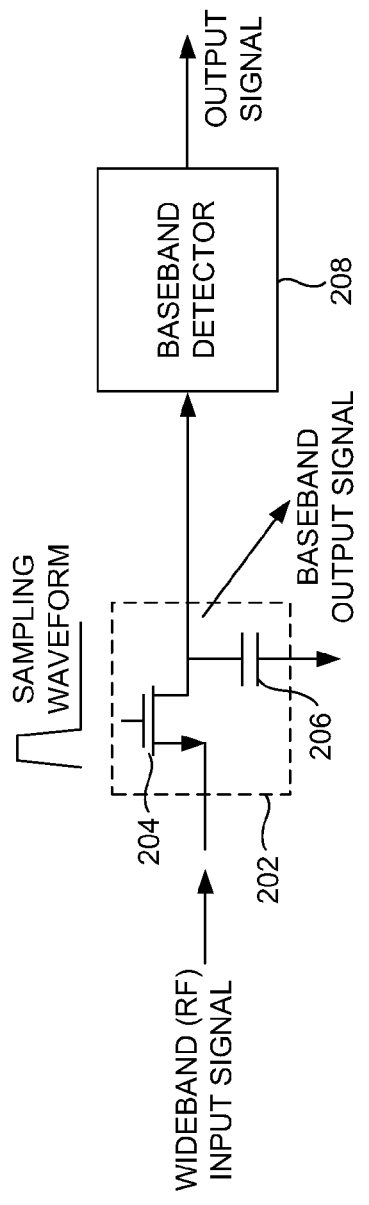
FIG. 2
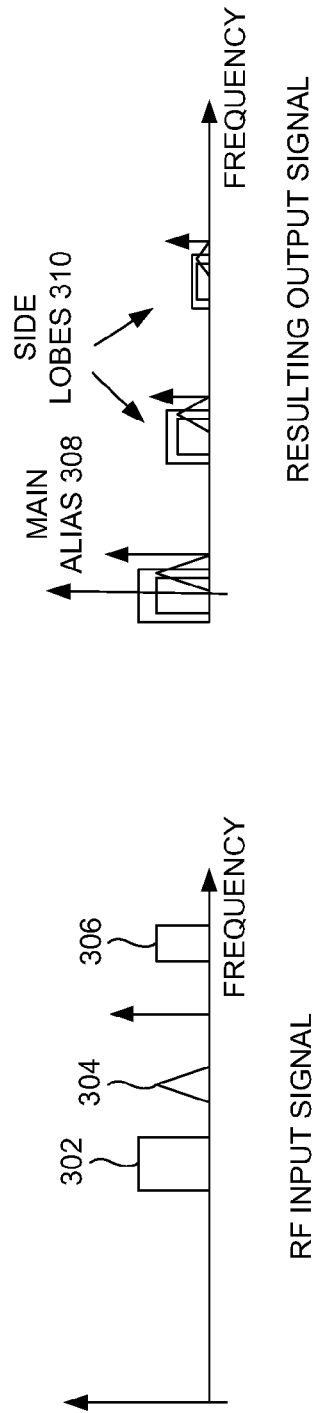
FIG. 3B
FIG. 3A

SUBSAMPLING WIDEBAND RSSI CIRCUIT

BACKGROUND

1. Technical Field

The embodiments herein generally relate to received signal strength indication (RSSI) circuits, and, more particularly, to a subsampling wideband RSSI circuit.

2. Description of the Related Art

Communication and measurement systems often require some form of power sensing as a means to measure the power of a signal. A RSSI circuit is used to measure the power in the received signal. A detector such as a root mean square (RMS) power detector or a peak detector are two commonly used RSSI circuits. The RMS power detector (i.e., $I^2+Q^2$) is typically implemented with a circuit that has a second order non-linearity and provides a DC output proportional to the total RMS signal power.

The drawbacks of typical power detectors include limited bandwidth, relatively high minimum detectable signal, and high power consumption when used to detect radio frequency (RF) signals. All of these are particularly acute in complementary metal oxide semiconductor (CMOS) technologies, in which the range of operability and performance is limited.

SUMMARY

In view of the foregoing, an embodiment herein provides a RSSI circuit comprises a subsampling circuit that processes an input signal comprising a sampling frequency, fs, wherein the subsampling circuit subsamples the input signal, wherein the input signal is subsampled to concentrate a power in a narrow bandwidth; an analog-to-digital converter (ADC) operatively connected to the subsampling circuit, wherein the ADC digitizes the subsampled signal; and a baseband detector operatively connected to the ADC, wherein the baseband detector detects a power from the digitized subsampled signal and creates an output signal. The subsampling circuit preferably comprises a first switch and a first capacitor, wherein the first switch and the first capacitor are driven by an in-phase (I) sampling waveform. The baseband detector preferably comprises any of a RMS ($I^2+Q^2$) detector, and a peak detector. Preferably, the subsampling circuit comprises a second switch and a second capacitor, wherein the second switch and the second capacitor are driven by a quadrature (Q) sampling waveform. The subsampling circuit and the ADC may operate as a single subsampling ADC. The RSSI circuit may further comprise ignoring higher order aliases at a multiple of the sampling frequency if the baseband detector is clocked at the sampling frequency.

Another embodiment provides an apparatus for detecting the power of an input signal, wherein the apparatus comprises a memory unit comprising a set of computer programmable instructions; a display unit operatively connected to the memory unit; a processor that executes the computer programmable instructions; a subsampling circuit that processes the input signal comprising a sampling frequency, fs, wherein the subsampling circuit subsamples the input signal, wherein the input signal is subsampled to concentrate a power in a narrow bandwidth; an ADC operatively coupled to the subsampling circuit, wherein the ADC digitizes the subsampled signal; and a baseband detector operatively coupled to the ADC, wherein the baseband detector detects a power from the digitized subsampled signal and creates an output signal. Preferably, the subsampling circuit comprises a first switch and a first capacitor, wherein the first switch and first capacitor are driven by an in-phase (I) sampling waveform. Moreover, the subsampling circuit preferably comprises a second switch and a second capacitor, wherein the second switch and second capacitor are driven by a quadrature (Q) sampling waveform. Also, the baseband detector preferably comprises any of a RMS ($I^2+Q^2$) detector, and a peak detector.

Another embodiment provides a method of detecting the power of an input signal comprising a sampling frequency, fs, integrated over a wide bandwidth in a RSSI circuit, wherein the method comprises subsampling the input signal to concentrate a power in a narrow bandwidth, wherein the input signal is subsampled over baseband frequencies range from DC to fs/2; and detecting a power from the input signal based on the subsampled input signal. Preferably, the input signal is subsampled by a subsampling circuit. Furthermore, the power from the input signal may be detected by a baseband detector. The method may further comprise ignoring higher order aliases at a multiple of the sampling frequency if the baseband detector is clocked at the sampling frequency. Moreover, the method may further comprise filtering higher order aliases at a multiple of the sampling frequency. Additionally, the baseband detector may comprise any of a RMS ($I^2+Q^2$) detector, and a peak detector.

The method may further comprise using the detected power to set a gain of a programmable gain RF amplifier that precedes the RSSI circuit. The subsampling circuit preferably comprises a first switch and a first capacitor, wherein the first switch and the first capacitor are driven by an in-phase (I) sampling waveform. Moreover, the subsampling circuit preferably comprises a second switch and a second capacitor, wherein the second switch and the second capacitor are driven by a quadrature (Q) sampling waveform. The method may further comprise digitizing the subsampled input signal.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2 illustrates an RSSI circuit according to an embodiment herein;

FIGS. 3A through 3B are graphical representations illustrating an RF input signal and a resulting output signal, respectively, according to the embodiments herein;

DETAILED DESCRIPTION OF PREFERRED EMBODIMENTS

Figure 1A:
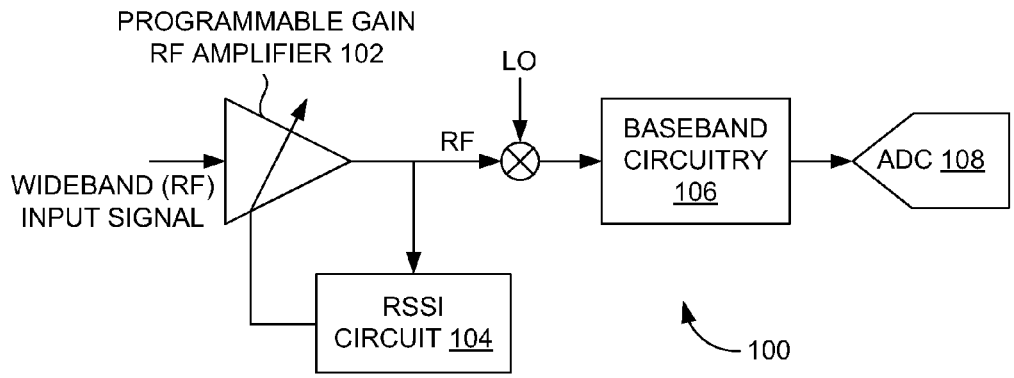
FIG. 1A illustrates a RF receiver employing an subsampling RSSI circuit according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an RSSI circuit 400 which uses a subsampling circuit 402 to subsample the input signal over a certain bandwidth down to baseband frequencies. The wideband RF signal is first subsampled, thus shifting its power to baseband to relax the bandwidth requirements of a (possibly digital) baseband detector 410. An ADC 408 receives this concentrated input signal from the subsampling circuit 402 and digitizes (e.g., converts to a digital form) the concentrated input signal. Referring now to the drawings and more particularly to FIGS. 1A through 6, where similar reference characters denote corresponding features consistently throughout the figures, there are shown preferred embodiments.

FIG. 1A illustrates an example of one possible location of an RSSI circuit 104 in an RF receiver 100. As shown, the first stage in the RF receiver 100 is a programmable gain RF amplifier 102. The programmable gain RF amplifier 102 may be embodied as a low noise amplifier in order to receive weak signals (e.g., a wideband RF input signal). The gain of the RF amplifier 102 is programmable so as to reduce its gain in case of large signals (in such a way that the RF receiver 100 output does not saturate).

The gain is made to be dependent on the signal amplitude, or strength, by providing a subsampling RSSI circuit 104 as a feedback around the programmable gain RF amplifier 102. The RF signal from the RF amplifier 102 is subsampled by the RSSI circuit 104. The baseband circuitry 106 may filter and amplify the weak signal received from the mixer. The ADC 108 is used to digitize the signal for use in the following digital baseband.

Figure 1B:
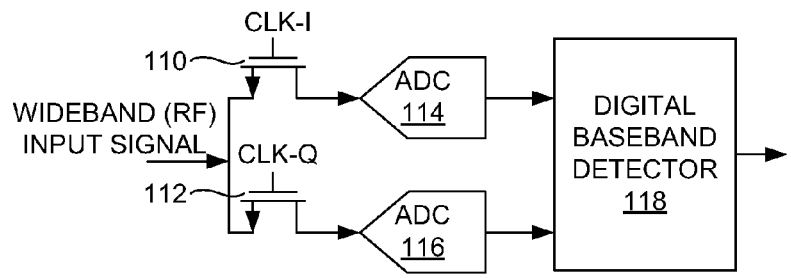
FIG. 1B illustrates an exploded view of the subsampling RSSI circuit of FIG. 1A having two switches, two ADC, and a digital baseband detector according to an embodiment herein.
Figure 1B:
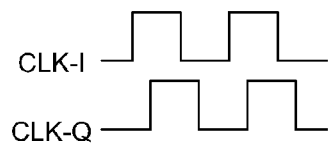

FIG. 1B illustrates an exploded view of the subsampling RSSI circuit 104 of FIG. 1A having two switches 110 and 112, two ADC 114 and 116, and a digital baseband detector 118 according to an embodiment herein. The two switches 110 and 112 constitute a sampling circuit of the RSSI circuit 104 which may be implemented as a single transistor or a transmission gate (e.g., pair of NFET and PFET transistors 110 and 112). The gate input may be used as the sampling clock (e.g., CLK-I and CLK-Q) and the source and the drain terminals as the input and output terminals of the subsampling circuit.

The graph represents the in-phase (I) and quadrature (Q) signals when subsampled with respect to the sampling frequency, fs. In this case, I and Q signals must be non-overlapping to prevent signal leakage from in-phase to quadrature signals and from quadrature signals to in-phase signals (e.g., as shown in graph of FIG. 1B).

Figure 1C:
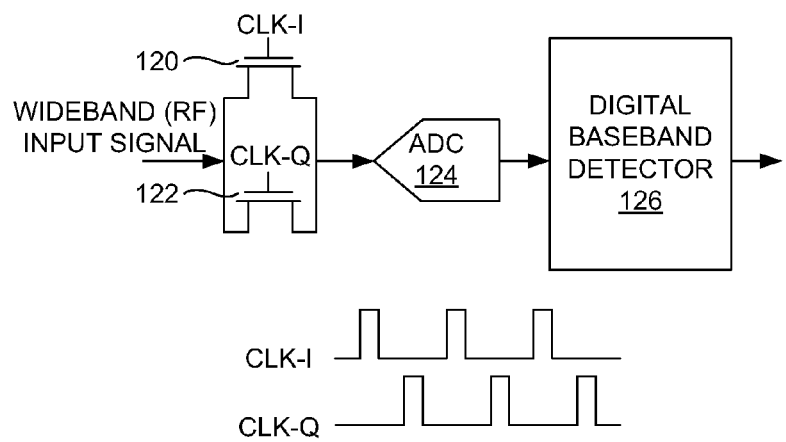
FIG. 1C illustrates an exploded view of the subsampling RSSI circuit of FIG. 1A having two switches, an ADC, and a digital baseband detector according to an embodiment herein.

FIG. 1C illustrates an exploded view of the subsampling RSSI circuit 104 of FIG. 1A having two switches 120 and 122, an ADC 124, and a digital baseband detector 128 according to an embodiment herein. The two switches 120 and 122 constitute a sampling circuit of the RSSI circuit 104 which may be implemented as a single transistor or a transmission gate (e.g., pair of NFET and PFET transistors 120 and 122). The gate input may be used as the sampling clock (e.g., CLK-I and CLK-Q) and the source and the drain terminals as the input and output terminals of the subsampling circuit.

The graph represents the in-phase (I) and quadrature (Q) signals when subsampled with respect to the sampling frequency, fs. In this case, I and Q signals must be non-overlapping to prevent signal leakage from in-phase to quadrature signals and from quadrature signals to in-phase signals (e.g., as shown in graph of FIG. 1C). FIG. 1B and FIG. 1C illustrate embodiments of the subsampling RSSI circuit 400 of FIG. 4 as described further with reference to FIG. 4.

FIG. 2 illustrates an RSSI circuit 200 having a subsampling circuit 202, and a baseband detector 208. The subsampling circuit 202 includes a switch 204 and a capacitor 206. During operation of the RSSI circuit 200, the switch 204 is switched at a rate fs to receive an input signal (e.g., a wideband (RF) signal is received by the subsampling circuit 202). If the sampling frequency "fs" is less than the frequency of the input signal, the resulting output signal is subsampled. The wideband (RF) signal contains a frequency up to RF or mm (e.g., wavelength) frequencies. The voltage on the capacitor 206 includes the baseband output signal.

The baseband detector 208 detects a wideband RF power concentrated in the narrower bandwidth of fs/2 and outputs a signal (e.g., as shown in FIG. 3A). The baseband detector 208 is embodied, for example, as an analog RMS detector, a peak detector, etc. In one embodiment, the subsampling circuit 202 includes one switch 204 and one capacitor 206. In another embodiment, the subsampling circuit 202 may include two switches and two capacitors. In this case, one switch and one capacitor are driven by an in-phase (I) sampling waveform and the second switch and the second capacitor are driven by a quadrature (Q) sampling waveform. In another embodiment, the two switches can be time shared (e.g., as shown in FIG. 1C).

FIG. 3A is graphical representation illustrating an RF input signal (i.e., the RF input signal received by the subsampling circuit 202 of FIG. 2) and FIG. 3B is a graphical representation illustrating a resulting output signal (i.e., the output signal at the subsampling stage 202 of FIG. 2). The RF input signal contains multiple signals (e.g., a signal 302, a signal 304, and a signal 306) that are spread out across a frequency band (e.g., as illustrated in FIG. 3A). The subsampling action folds all of the signals down to a main alias 308 that extends from DC to fs/2.

Higher order aliases (e.g., a side lobes 310) appear at multiples of fs (e.g., as shown in FIG. 3B). The higher order aliases (the side lobes 310) can be filtered or ignored if the baseband detector 208 (of FIG. 2) is operated in a discrete time (e.g., if the baseband detector 208 is clocked at the sampling frequency, fs).

Figure 4:
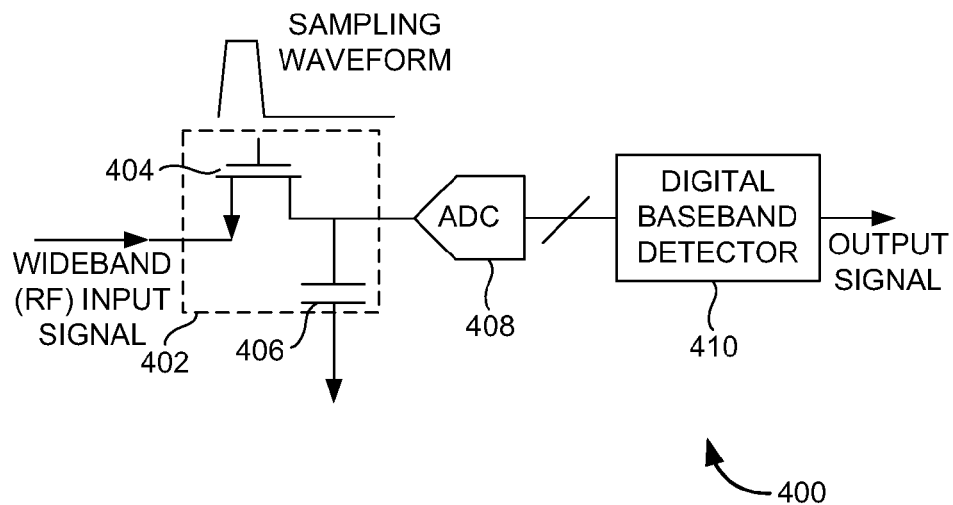
FIG. 4 illustrates an exploded view of the subsampling RSSI circuit of FIG. 1A having a subsampling circuit, an ADC, and a baseband detector according to an embodiment herein.

FIG. 4 illustrates a subsampling RSSI circuit 400 (e.g., the subsampling RSSI circuit 104 of FIG. 1A) having a subsampling circuit 402, an ADC 408, and a baseband detector 410 according to an embodiment herein. The subsampling circuit 402 includes a switch 404 and a capacitor 406. During operation of the RSSI circuit 400, the switch 404 is switched at a frequency "fs" (e.g., the subsampling circuit 402 receives a wideband RF signal). If the sampling frequency "fs" is less than the frequency of the input signal, the resulting output signal is subsampled.

The subsampling circuit 402 concentrates and subsamples (e.g., aliases) the input signal over a certain bandwidth down to baseband frequencies. The input signal is subsampled (e.g., aliased) to relax the bandwidth requirements of the ADC 408 and the baseband detectors 410. In one embodiment, the subsampling circuit 402 may be implemented as a single transistor or a transmission gate (e.g., pair of NFET and PFET transistors). The gate input may be used as the sampling clock (e.g., CLK-I and CLK-Q) and the source and the drain terminals as the input and output terminals of the subsampling circuit 400 (e.g., as shown in FIG. 1B and FIG. 1C).

In another embodiment, the sampling circuit 402 may include a second switch and a second capacitor. In this case, the first switch and the first capacitor are driven by an in-phase ("I") sampling waveform and the second switch and the second capacitor are driven by a quadrature "Q" sampling waveform. The ADC 408 is connected with the subsampling circuit 402. In one embodiment, the ADC 408 is a flash ADC of N bits (e.g., 3-5 bits) of resolution and the sampling frequency "fs" is relatively low. The ADC 408 receives a concentrated input signal (e.g., a subsampled signal) from the subsampling circuit 402 and digitizes (e.g., converts to a digital form) the concentrated input signal.

The digital baseband detector 410 detects the power of the subsampled digital signal from DC to fs/2. In one embodiment, the digital baseband detector 410 detects when the power from the digitized concentrated input signal is below or above a pre-determined threshold. These events are then used to set the gain of the programmable gain RF amplifier 102 preceding the RSSI circuit 104. The digital baseband detector 410 is embodied, for example, as a RMS ($I^2+Q^2$) detector, or a peak detector, etc.

Figure 5:
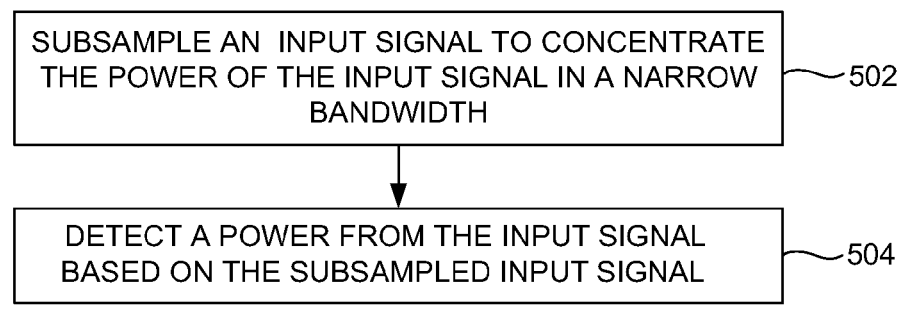
FIG. 5 is a flow diagram illustrating a method of detecting a power of an input signal in the RSSI circuit according to an embodiment herein.

FIG. 5, with reference to FIGS. 1A through 4, is a flow diagram illustrating a method of detecting the power of an input signal comprising a sampling frequency, fs, integrated over a wide bandwidth in a RSSI circuit 104 according to an embodiment herein, wherein the method comprises subsampling (502) the input signal to concentrate a power in a narrow bandwidth, wherein the input signal is subsampled over baseband frequencies range from DC to fs/2; and detecting (504) a power from the input signal based on the subsampled input signal. Preferably, the input signal is subsampled by a subsampling circuit 104. Furthermore, the power from the input signal may be detected by a baseband detector 128. The method may further comprise ignoring higher order aliases at a multiple of the sampling frequency if the baseband detector 128 is clocked at the sampling frequency. Moreover, the method may further comprise filtering higher order aliases at a multiple of the sampling frequency. Additionally, the baseband detector 128 may comprise any of a RMS ($I^2+Q^2$) detector, and a peak detector. The method may further comprise using the detected power to set a gain of a programmable gain RF amplifier 102 that precedes the RSSI circuit 104. The method may further comprise digitizing the subsampled input signal.

Figure 6:
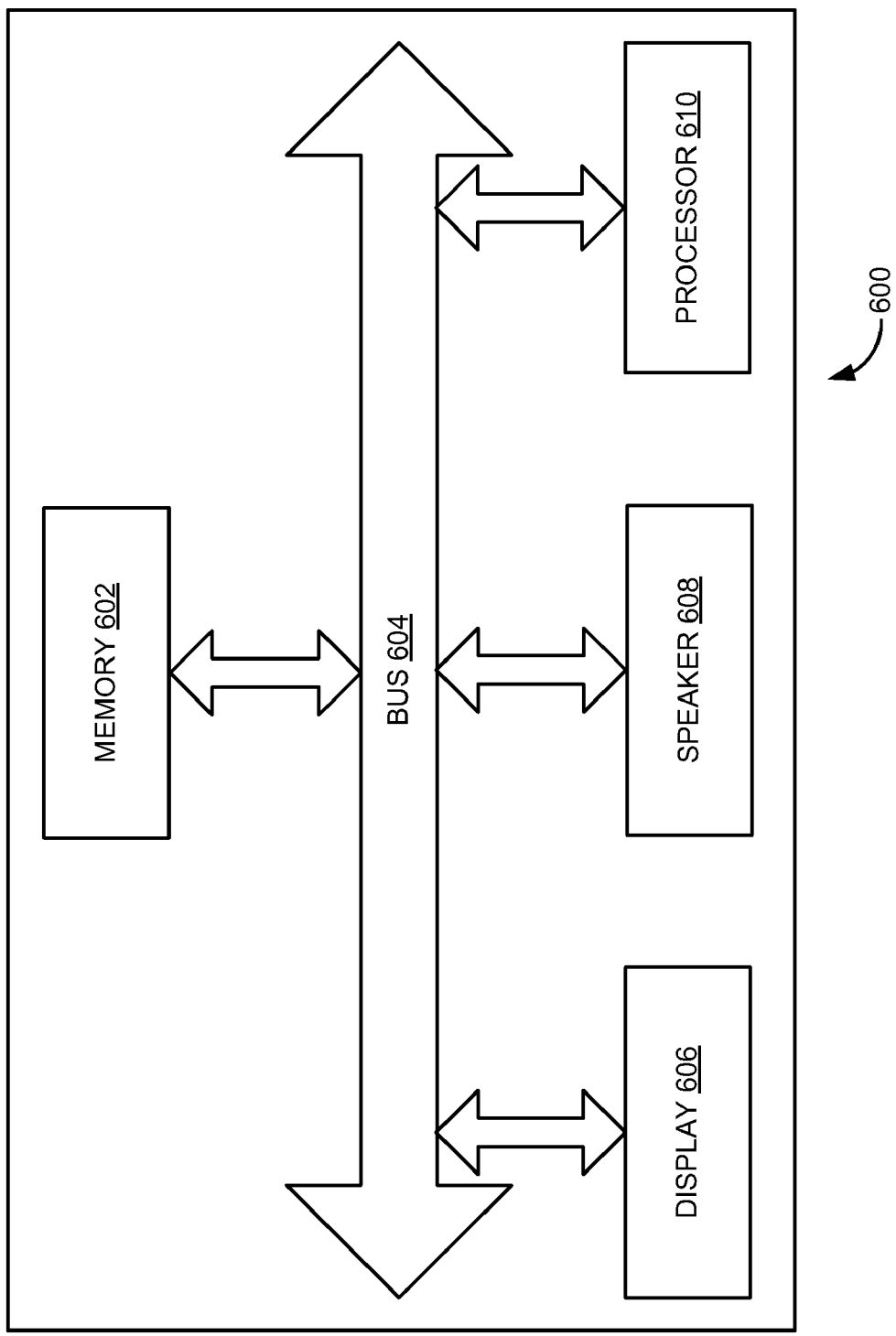
FIG. 6 illustrates a schematic diagram of a receiver according to an embodiment herein.

FIG. 6 illustrates a schematic diagram of a receiver 600 having an a memory 602 having a computer set of instructions, a bus 604, a display 606, a speaker 608, and a processor 610 capable of processing a set of instructions to perform any one or more of the methodologies herein, according to an embodiment herein. The processor 610 may also enable digital content to be consumed in the form of video for output via one or more displays 606 or audio for output via speaker and/or earphones 608. The processor 610 may also carry out the methods described herein and in accordance with the embodiments herein.

Digital content may also be stored in the memory 602 for future processing or consumption. The memory 602 may also store program specific information and/or service information (PSI/SI), including information about digital content (e.g., the detected information bits) available in the future or stored from the past. A user of the receiver 600 may view this stored information on display 606 and select an item of for viewing, listening, or other uses via input, which may take the form of keypad, scroll, or other input device(s) or combinations thereof. When digital content is selected, the processor 610 may pass information. The content and PSI/SI may be passed among functions within the receiver 600 using bus 604.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The RSSI circuit 400 uses a subsampling circuit 402 to subsample the input signal over a certain bandwidth down to baseband frequencies. The wideband RF signal is first shifted to baseband to relax the bandwidth requirements of the digital baseband detector 410 and thus reducing the power consumption and increasing its sensitivity. Aliasing serves to concentrate the power in a narrow bandwidth from DC to fs/2 (for example, DC to 10 MHz). The ADC 408 receives a concentrated input signal from the subsampling circuit 402 and digitizes (e.g., converts to a digital form) the concentrated input signal. Because the wideband signal is first transferred to baseband, the bandwidth requirements of the digital baseband detector 410 is greatly relaxed. The subsampling circuit for both I and Q signals can be merged into a single sampling circuit with non-overlapping clocks to reduce circuitry by half.

Additionally, the power consumption of the digital baseband detector 410 is significantly reduced and its sensitivity can be increased. The power detection can be performed digitally due to the presence of the ADC 408, thus eliminating the need for analog power detectors altogether. The use of subsampling circuit 402 relaxes the bandwidth of following baseband detector, greatly improving the performance of the detector when used for RF power detection. The subsampling circuit and the ADC may be configured to operate as a single subsampling ADC.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A received signal strength indicator (RSSI) circuit comprising:
    a subsampling circuit that processes an input signal comprising a sampling frequency, fs, wherein said subsampling circuit subsamples said input signal, wherein said input signal is subsampled to concentrate a power in a narrow bandwidth, and wherein said subsampling circuit comprises:
        a first switch and a first capacitor, wherein said first switch and said first capacitor are driven by an in-phase (I) sampling waveform; and
        a second switch and a second capacitor, wherein said second switch and said second capacitor are driven by a quadrature (Q) sampling waveform;
    an analog-to-digital converter (ADC) operatively connected to said subsampling circuit, wherein said ADC digitizes the subsampled signal; and
    a baseband detector operatively connected to said ADC, wherein said baseband detector detects a power from the digitized subsampled signal and creates an output signal.

2. The RSSI circuit of claim 1, wherein said first switch and said second switch comprise a transistor.

3. The RSSI circuit of claim 1, wherein said baseband detector comprises any of a root mean square (RMS) ($I^2+Q^2$) detector, and a peak detector.

4. The RSSI circuit of claim 1, wherein said first switch and said second switch comprise a transmission gate.

5. The RSSI circuit of claim 1, wherein said subsampling circuit and said ADC operate as a single subsampling ADC.

6. The RSSI circuit of claim 1, further comprising ignoring higher order aliases at a multiple of said sampling frequency if said baseband detector is clocked at said sampling frequency.

7. An apparatus for detecting the power of an input signal, said apparatus comprising:
    a memory unit comprising a set of computer programmable instructions;
    a display unit operatively connected to said memory unit;
    a processor that executes said computer programmable instructions;
    a subsampling circuit that processes said input signal comprising a sampling frequency, fs, wherein said subsampling circuit subsamples said input signal, wherein said input signal is subsampled to concentrate a power in a narrow bandwidth, and wherein said subsampling circuit comprises:
        a first switch and a first capacitor, wherein said first switch and first capacitor are driven by an in-phase (I) sampling waveform; and
        a second switch and a second capacitor, wherein said second switch and second capacitor are driven by a quadrature (Q) sampling waveform;
    an analog-to-digital converter (ADC) operatively coupled to said subsampling circuit, wherein said ADC digitizes the subsampled signal; and
    a baseband detector operatively coupled to said ADC, wherein said baseband detector detects a power from the digitized subsampled signal and creates an output signal.

8. The apparatus of claim 7, wherein said first switch and said second switch comprise a transistor.

9. The apparatus of claim 7, wherein said first switch and said second switch comprise a transmission gate.

10. The apparatus of claim 7, wherein said baseband detector comprises any of a root mean square (RMS) ($I^2+Q^2$) detector, and a peak detector.

11. A method of detecting the power of an input signal comprising a sampling frequency, fs, integrated over a wide bandwidth in a received signal strength indicator (RSSI) circuit, said method comprising:
    subsampling said input signal by a subsampling circuit to concentrate a power in a narrow bandwidth, wherein said input signal is subsampled over baseband frequencies range from DC to fs/2; and
    detecting a power from said input signal based on the subsampled input signal,
    wherein said subsampling circuit comprises a first switch and a first capacitor,
    wherein said first switch and said first capacitor are driven by an in-phase (I) sampling waveform,
    wherein said subsampling circuit comprises a second switch and a second capacitor, and
    wherein said second switch and said second capacitor are driven by a quadrature (Q) sampling waveform.

12. The method of claim 11, wherein first switch and said second switch comprise a transistor.

13. The method of claim 11, wherein said power from said input signal is detected by a baseband detector.

14. The method of claim 11, further comprising ignoring higher order aliases at a multiple of said sampling frequency if said baseband detector is clocked at said sampling frequency.

15. The method of claim 11, further comprising filtering higher order aliases at a multiple of said sampling frequency.

16. The method of claim 13, wherein said baseband detector comprises any of a root mean square (RMS) ($I^2+Q^2$) detector, and a peak detector.

17. The method of claim 11, further comprising using the detected power to set a gain of a programmable gain RF amplifier that precedes the RSSI circuit.

18. The method of claim 11, wherein said first switch and said second switch comprise a transmission gate.

19. The method of claim 18, further comprising using a gate input of said transmission gate as a sampling clock.

20. The method of claim 11, further comprising digitizing the subsampled input signal.

* * * * *